UNITED STATES PATENT OFFICE.

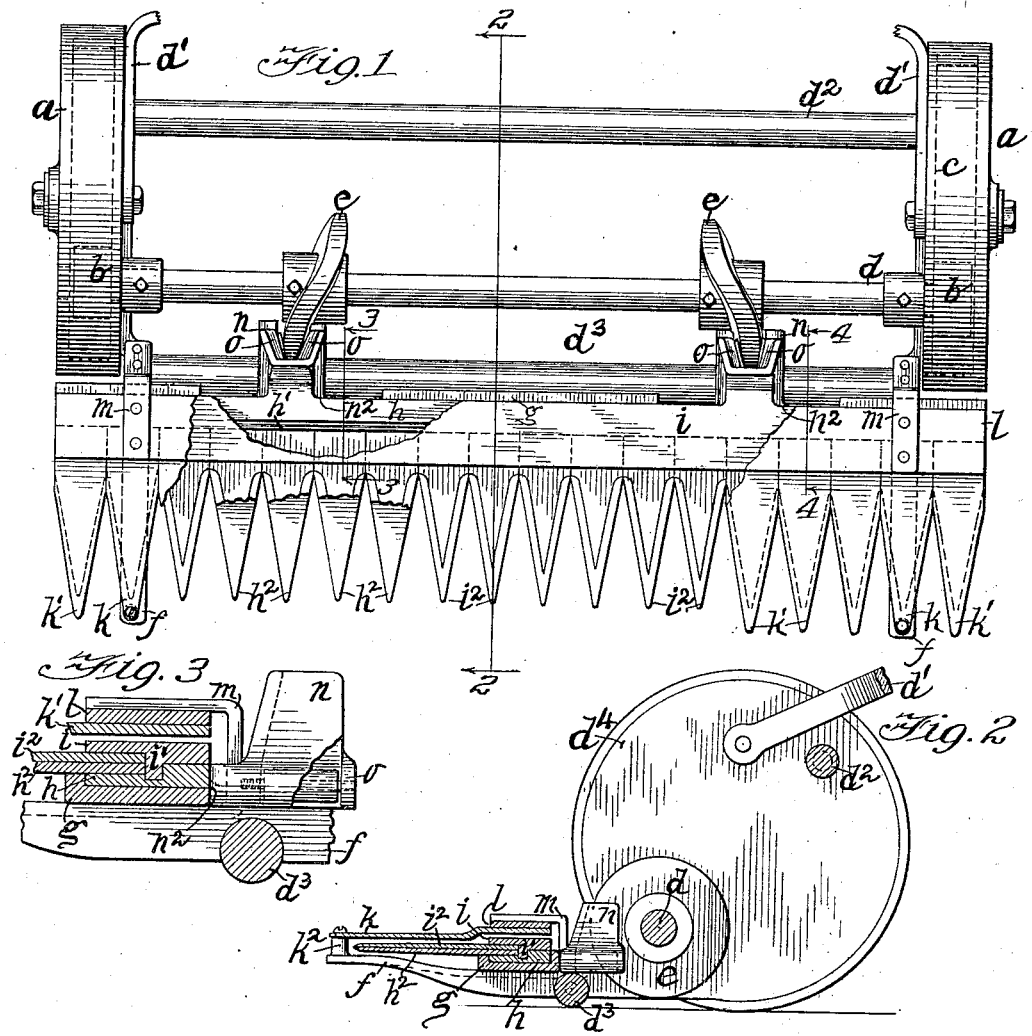

AUGUST BERENS, OF CHICAGO, ILLINOIS.

LAWN-MOWER.

944,712.  Specification of Letters Patent.  Patented Dec. 28, 1909.

Application filed April 12, 1909. Serial No. 489,274.

*To all whom it may concern:*

Be it known that I, AUGUST BERENS, a citizen of the United States, and resident of Chicago, in the county of Cook and State of Illinois, have invented certain new and useful Improvements in Lawn-Mowers, of which the following is a full and correct specification, reference being had to the hereto accompanying drawing, forming a part hereof, and in which—

Figure 1 is a lawn mower in top plan view in which some of the parts are shown broken away. Fig. 2 is a sectional end view of Fig. 1 taken on the cutting plane 2 2 of Fig. 1. Fig. 3 is a sectional end view of Fig. 1 on the cutting plane 3 3 of Fig. 1. Fig. 4 is a sectional end view on the cutting plane 4 4 of Fig. 1. Fig. 5 is a rear view of one of the sockets $n$.

Like reference letters denote like parts throughout.

The object of my invention is to provide an economic and simple construction of mechanism for actuating one or two sickle-bars of a lawn mower. To attain said desirable end I superimpose two sickle-bars $i$ $h$ and so arrange the sickles thereon and their propelling mechanism that only one half of the motion of each sickle-bar is required that a single sickle-bar would need and, consequently, less friction is encountered, besides other advantages which will be pointed out.

The wheel mechanism and other parts, as $a$ $b$ $c$ $d$ $d'$ $d^2$ $d^3$ $d^4$ is of the usual construction found on what is known as the Philadelphia lawn mower. To the shaft $d$ of said mower are attached two circular wabble-cams $e$ which play in sockets $n$ provided with anti-friction rollers $o$ against which play, alternately, the sides of said cams. Each of said sockets with its rollers is attached to a separate sickle-bar, as $i$ and $h$, the former provided with a bead $i'$ which plays in a groove $h'$ of the sickle-bar $h$ and both of said bars rest and play on a channel shaped bar $g$ which rests on arms $f$ which form integral parts of the disks $d^4$ of the wheels $a$, and the rear edges of said bars play against the shoulders $n^2$ of the sockets $n$ and from said socket also rise the L-shaped arms $m$ which support the bar $l$ to which are attached the guards $k'$ over the sickle-cutters $h^2$ $i^2$.

Arms $k$ on the bar $l$ reach to the stud $k^2$ which connects them with the brackets or arms $f$ integral with the disks $d^4$ which thereby hold the shields $k'$ rigidly to place.

To each of the sickle-bars $h$ and $i$ is attached a socket $n$ provided with anti-friction rollers $o$ and against said rollers play, alternately, the opposite faces of the wabble-cams $e$ which, thereby, thrust said sickle-bars in their longitudinal directions.

By providing two sickle-bars and wabble-cams, and inverting, relatively to each other, the sickle-blades, the cutting edges are doubled and, consequently, the motion of the sickle-bars is reduced to one half, and through said reduction the pitch of the wabble-cams is also reduced and consequently their friction reduced to less than one half because the cams act like wedges whose power, when sharpened increases in greater proportion.

A roller $d^3$ immediately under the rear edges of the sickle-bars keeps the sickles at proper elevation from the ground.

It is plainly evident that this double construction of sickle-bars and their actuating mechanism may be reduced to a single bar and its single actuating mechanism without greatly altering the principle of my said construction.

What I claim is:

The combination with wabbling cams and means driven by said cams, the cams being pitched to throw said means in opposite directions and to complete one vibration for each cam-revolution, of superimposed sickle-bars actuated by said means, tongued and grooved mechanism to guide one sickle-bar on the other, and means under the lower sickle-bar to guide and carry it, and carrying-arms under the lower sickle-bar and a machine-frame to which said arms are connected.

AUGUST BERENS.

Witnesses:
WM. ZIMMERMAN,
M. SULLIVAN.